Patented Sept. 4, 1951

2,566,515

UNITED STATES PATENT OFFICE 2,566,515

DRYING OIL COMPOSITION

Joseph D. Danforth, Grinnell, Iowa, assignor to Universal Oil Products Company, Chicago, Ill., a corporation of Delaware No Drawing. Application September 18, 1947, Serial No. 774,885

8 Claims. (Cl. 260—404)

The present invention relates to the preparation of a novel composition of matter comprising a drying oil co-bodied with an unsaturated amine containing olefinic double bonds. More specifically, the invention relates to the production of a composition of matter containing a drying oil of either the hydrocarbon type or of the unsaturated fatty acid ester type co-bodied with a mono- or polyalkenyl or an alkapolyvenyl amine to thereby form a co-bodied product useful in the formulation of coating compositions, such as paints and varnishes and in the production of resin-like products.

It has been generally shown by the prior art that the simple application of heat to a fatty acid ester type of drying oil effects a desirable change in the structure of the oil and produces a product having better drying qualities and improved spreading characteristics as compared to the raw, unheated oil. This desirable change in structure has been attributed to polymerization effects between the double bonds of two or more molecules of the drying oil subjected to the treatment. The process has been referred to by the art as a so-called "bodying" reaction and although it is particularly applicable to those drying oils containing a conjugated system of double bonds within the molecule, it may also be applied with advantage to the so-called semi-drying oils which contain olefinic double bonds in non-conjugated relationship to each other. The bodying procedure in the case of the semi-drying oils is believed to result in the isomerization of the fatty acid portion of the drying oil comprising a shift of the olefinic double bonds from their original non-conjugated relationship to a conjugated system of double bonds. Since conjugation of the double bonds is believed to increase the drying properties of the oil, the bodying procedure effects this desirable change of the oil. It has also been demonstrated by the prior art that improved drying oils as well as paint and varnish compositions may be obtained by incorporating in the drying oil or composition various organic substances which affect their bodying or drying properties. Among the substances employed by the prior art are various organic hydroxyl compounds which when reacted with the oil, undergo an alcoholysis reaction with the fatty acid ester comprising the drying oil to yield a modified ester having its own individual drying characteristics. Typical of such compounds are the phenols, alcohols and alkenolamines. Other paint and varnish compositions have been prepared containing amines as the ingredient thereof, but in the latter type of composition, the amine is present merely as a component for its physical effect on the film-forming tendency of the drying oil. The present invention as distinguished from the prior art compositions containing amines merely in physical solution in the drying oil concerns the production of a composition of matter having drying and resin-forming properties which comprises a drying oil of either or both the fatty acid glyceride or hydrocarbon type co-bodied in chemical composition with an unsaturated amine as hereinafter specified.

One object of the present invention is to provide a process for co-bodying an unsaturated amine with a drying oil of the unsaturated fatty acid ester type or of the unsaturated hydrocarbon type to form a drying oil composition having modified drying properties.

Another object of the invention is to prepare a drying oil composition which has improved flow characteristics when applied to a surface capable of retaining a film of said composition, thereby enabling the same to spread evenly and to form a uniform, smooth surface which does not set to show brush marks.

A further object achieved by this invention is to manufacture compositions of matter containing a drying oil and a drying oil resin which are miscible and compatible in all proportions.

Still another object of the invention is to provide drying oils which either separately or when composited with pigments, resins, etc. in paint or varnish compositions are capable of drying thoroughly to form a tough, water-resisting film which is free from tackiness after a reasonable drying period.

In accordance with the present process, the composition of matter comprising this invention is produced in a co-bodying procedure by heating a drying oil of the unsaturated fatty acid ester type separately or in admixture with varying proportions of a drying oil of the unsaturated hydrocarbon type with an unsaturated amine containing acyclic double bonds.

In a more specific embodiment, the present invention relates to a process for co-bodying an unsaturated drying oil of the fatty acid ester type or of an unsaturated hydrocarbon type in the presence of a trace to about 50 weight per cent of an alkenyl amine by heating a mixture of said reactants to a temperature of from about 200° to about 300° C. for a period of time sufficient to effect at least partial co-polymerization of said drying oil with said alkenyl amine to form a co-bodied drying oil having dispersed therein the co-polymerization product of said amine and drying oil components.

Other embodiments and other objects of the present invention will be hereinafter referred to in greater detail in the following further description of the invention.

By means of the present process, an unsaturated drying oil containing olefinic double bonds in either conjugated or non-conjugated relationship to each other or a mixture of the various types of drying oils is co-bodied with an unsaturated amine containing acyclic unsaturation to effect a co-bodying reaction between the unsaturated reactants. Although no conclusive evidence is known that would establish the precise mechanism of reaction, the physical properties of the gel-like resinous product formed when the reaction is permitted to proceed to ultimate completion indicates that the co-bodying procedure of the present process is the result of a co-polymerization and/or a condensation of the Diels Alder type between the reactants charged to the process. It is also considered probable that in the present process some of the unsaturated amine reacts in a manner similar to an olefinic hydrocarbon to form co-polymers with the unsaturated amine by virtue of the reaction between the double bonds contained in the drying oil with the double bonds present in the unsaturated amine. Thus, the present product is believed to be the result of a combination of several types of reactions including a co-polymerization reaction between the acyclic double bonds present in the reactants as well as a condensation reaction of the Diels Alder type between the conjugated double bonds of either or both the drying oil components and/or of the unsaturated amine, thereby resulting in the formation of a condensation product containing cyclic structural units. It is also considered as likely that when the fatty acid ester type of drying oil is selected as the drying oil component charged into the reaction mixture (as for example, the mixture of glyceride esters present in linseed oil), some of the amines herein specified induce at least a partial saponification of the drying oil fatty acid esters, especially when the more basic amines are utilized. It is thus probable that due to the saponification reaction, some of the chemical linkages in the co-bodied product are of the fatty acid amide type. The resulting products are nevertheless as equally effective as the co-bodied ester for substantially all purposes for which the ester itself may be applied.

One of the outstanding advantages of the present product, containing as it does in its structure an amino nitrogen atom, is the slight basicity of the co-bodied product. The basicity of the composition is especially advantageous when the composition is utilized in coating compositions, such as paints and varnishes which contain slightly acidic resins or other components such as decomposable esters which yield acidic decomposition products. Many paint and varnish compositions are prepared on the basis of formulas containing resin ingredients which are decomposable under certain conditions to yield acidic decomposition products as in the case of the polyvinyl chloride or vinylidene chloride resins which upon being subjected to weathering conditions in the presence of moisture decompose slightly, liberating small but nevertheless damaging quantities of hydrogen chloride. The free hydrogen chloride present in the coating composition catalyzes further decomposition of the resin with resultant further liberation of hydrogen chloride, thus progressively and ultimately causing substantial breakdown and failure of the coating composition containing this type of resinous ingredient. Also in the case of those coating compositions containing rosin as a component thereof, weather stability of the composition is considerably reduced because of the slightly acidic properties of rosin. In many instances the acidity of the coating composition results in corrosion of the object being coated as in the case of metallic structures, such as steel beams and sheet metal enclosures. In utilizing the present product as a coating composition ingredient, as for example, as a component in a paint or varnish composition, the slight basicity of the present drying oil composition overcomes the acidity of the resin upon weathering, presumably by virtue of the neutralizing action of the drying oil on the rosin or liberated acidic component. It has been observed that coating compositions containing the present nitrogen-containing drying oil component possess enhanced weather stability and are non-corrosive when applied to the object being coated.

The component charged into the present co-bodying process herein specified as a drying oil includes generally the unsaturated fatty acids and their esters, such as the glyceride-unsaturated fatty acid esters as well as the hydrocarbon type of drying oil hereinafter identified and described in greater detail. The fatty acid ester type of drying oils occurs naturally as fatty acid glycerides, although these may be modified for the purposes of the present process by replacing the glyceride ester linkage with other types of alcohols, such as ethanol, polyhydroxy glycols such as ethylene glycol, phenols such as a cresol, or alkanol amines represented for example, by the ethanol amines. Included among the fatty acid oils utilizable in the present process are the drying and semi-drying classes containing conjugated and/or non-conjugated olefinic double bonds. Of these, tung oil, linseed oil (either raw or boiled linseed oil), dehydrated castor oil, oiticica oil, perilla oil, olive oil, cotton-seed oil, coconut oil, soybean oil, hemp-seed oil, poppy-seed oil, safflower oil, walnut oil, etc. are representative oils of the glyceride ester type utilizable herein. The fatty acid esters contained in the above oils may be hydrolyzed and the fatty acids liberated by hydrolysis may be recovered and utilized herein as the drying oil in the present composition. It is believed, however, that even when the unhydrolyzed ester is charged to the reaction that at least partial hydrolysis of the ester occurs by virtue of the saponification reaction of the ester by the unsaturated amine to yield a product wherein some of the nitrogen atoms of the amine are bound to the fatty acids by an amide type of linkage.

The drying oils herein specified as the hydrocarbon type drying oils comprise hydrocarbons of unsaturated structure generally of relatively high molecular weight, above about 250 and usually of cyclic structure containing conjugated as well as non-conjugated unsaturation. Hydrocarbons of the above type having drying oil properties may be prepared in any suitable manner known to the art or may be derived from the various natural sources, as in the case of the terpene hydrocarbons. One of the preferred sources of the hydrocarbon type of drying oil which is especially suitable as the drying oil reactant in the present process, are the catalyst-hydrocarbon sludges recovered from certain hydrocarbon conversion processes utilizing catalysts capable of causing conjunct polymerization between the hydrocarbon reactants charged to the conversion process. Typical of the catalysts capable of causing conjunct polymerization reactions are the various Friedel Crafts metal halide catalysts such as aluminum chloride and aluminum bromide and certain members of the acid type of catalyst such as concentrated sulfuric acid, substantially anhydrous hydrogen fluoride and borontrifluoride as well as others generally known to the art. The above catalysts when contacted with a reactive hydrocarbon, such as an olefin or a branched chain paraffin at reaction conditions favorable to the formation of conjunct polymers, produces a catalyst-hydrocarbon containing sludge as a distinct reaction product of the process. Conjunct polymerization occurs in the mixture of catalyst and hydrocarbon by virtue of hydrogen transfer reactions between the hydrocarbons and subsequent polymerization and cyclization of the resulting hydrogen-poor hydrocarbons to form high molecular weight cyclic compounds generally referred to in the art as conjunct polymers containing from about 2 to about 3.5 double bonds per molecule in conjugated as well as non-conjugated relationship to each other. The conjunct polymers, usually having a molecular weight of from about 250 to about 450 and in some cases up to about 600 become bound by weak chemical bonds to the conjunct polymerization catalyst to form the sludge hereinabove referred to and may be released therefrom by heating the sludge, by hydrolyzing the chemical bonds, as for example by adding the sludge to water or a dilute caustic or they may be recovered by extraction or displacement with a solvent or a more reactive material. It is not the purpose nor is it essential here to describe in detail the methods of producing sludge or of recovering the hydrocarbon type of drying oil therefrom; a description of such processes may be had by reference to the art relating thereto.

It is to be emphasized that the present process does not merely form an amide reaction product in the case of utilizing a fatty acid ester as the drying oil component by the reaction of the fatty acid with the unsaturated amino reactant, although a portion of all of the amino nitrogen may be bound in this manner in specific instances. It is evident from an examination of the physical properties of the present product that the latter is at least partially the result of a co-polymerization or a Diels-Alder type of condensation reaction between the unsaturated bonds of the reacting components thereby resulting in the formation of resin-like products when the condensation and/or co-polymerization reaction is allowed to go to completion. When the reaction is suspended in its initial stage, the resin-like products resulting by virtue of the co-polymerization and/or condensation reactions become dispersed throughout the entire mass of the product and unreacted charging stocks, forming an oil-dispersed resin-like material as a product of the reaction. By this means, therefore, the usual difficulties accompanying an attempt to disperse a resin in a drying oil for the production of a coating composition are dispensed with and a product is formed which contains a resin-like material dispersed throughout the body of the remaining drying oil and which is compatible and miscible therewith in all proportions. By manipulating the ratio of the reactants, it is therefore possible to form a drying oil composition in which the resinous component is already dispersed and to which the other ingredients of the coating composition may be added for the manufacture of a paint or varnish product. Moreover, the dispersed resinous or resin-like product formed in the present process also contains double bonds capable of adding oxygen thereto and of undergoing further polymerization on contact with atmospheric oxygen, thereby resulting in a resin having further drying qualities.

The unsaturated amine utilized as a reactant in the present co-bodying process is of the type containing at least one, and preferably more than one, acyclic double bond as represented by an amine containing N-substituted alkapolyenyl substituents. The unsaturated amine may be represented by the following structural formula:

wherein $R_1$, $R_2$ and $R_3$ are selected from the group consisting of hydrogen, alkyl, alkenyl, alkapolyenyl, aryl, aralkyl, aralkenyl, or naphthenyl (cycloalkyl or cycloalkenyl) substituents, at least one of which group $R_1$, $R_2$, or $R_3$ is an alkenyl, alkapolyenyl or aralkenyl substituent. Preferably, more than one of the three groups $R_1$, $R_2$ and $R_3$ are alkenyl or alkapolyenyl radicals represented for example by butenyl or pentenyl groups. Typical reactants of the above classification are such representative compounds as methyldibutenylamine, N-octadienylbutenylamine, dibutenylanilin, N-cyclohexylbutenylmethylamine, N-(m-butenyl)-phenyloctadienylmethylamine, etc. Unsaturated amines wherein the unsaturation comprises at least a single acylic double bond may be prepared by processes well known to the art and the unsaturated amine utilized as a reactant in the present process may be derived from any of said sources. One method of preparation comprises reacting a monoalkyl substituted amine, such as isopropyl amine with an alkadiene such as butadiene in the presence of an alkali metal, such as sodium, at condensation reaction conditions to yield a dialkenylalkylamine, represented for example by isopropyl-butenyloctadienylamine when utilizing the foregoing typical reactants. The condensation reaction in the formation of an alkenyl amine by the above reaction may be effected at temperatures of from about 0° to about 150° C. and at pressures sufficient to maintain the reaction mixture in substantially liquid phase.

The process herein provided which is characterized as a co-bodying procedure between an unsaturated amine containing at least one acyclic double bond and a drying oil of the unsaturated fatty acid ester type and/or of the unsaturated hydrocarbon type is carried out preferably at a temperature of from about 150° to about 300° C. and at a pressure sufficient to maintain the reactants in substantially liquid phase, below about 100 atmospheres, although in the case of the utilization of charging stocks which do not vaporize at the reaction temperature and at normal pressure, atmospheric pressure is usually sufficient to effect the maintenance of the liquid phase condition. The reaction is ordinarily effected by mixing from a trace to about 50 weight per cent of the unsaturated amine herein specified, preferably from about 5 to about 30 weight per cent, with the drying oil or with a mixture of two or more drying oils of either or both the unsaturated fatty acid ester type or unsaturated hydrocarbon type previously specified. The time of reaction required to effect a given degree of co-bodying in general depends upon the type of product desired. It has been observed that as the reaction time is extended, the mixture progressively tends toward the formation of a gel-like resinous reaction product. If, however, the bodying process is interrupted prior to the formation of the gel-like product, an essentially fluid drying oil reaction product is obtained which contains dispersed therein a partial polymer and condensation reaction product of the unsaturated amine and the drying oil reactants, the latter fluid type being preferred for coating compositions and the like. It is desirable to discontinue the bodying reaction after a period which may vary from about one-half to about six hours, depending upon the ratio of amine to drying oil in the reaction mixture, the character of the reactants (that is, the number of unsaturated double bonds contained therein, particularly of the conjugated type), the temperature of reaction and various other factors affecting the bodying rate.

If desired, catalytic agents which tend to enhance the co-bodying reaction, such as dilute acids selected from the mineral acids (hydrochloric acid, sulfuric acid, phosphoric acid, etc.) and the organic acids (as for example, acetic acid, benzoic acid, etc.) may be incorporated into the reaction mixture in an amount of from about 0.1 per cent to about 10 per cent of the reaction mixture. The catalyst may be allowed to remain in the ultimate co-bodied product, or the latter may be washed or contacted with solvents such as water or a suitable organic solvent to extract the catalyst therefrom.

As indicated previously, it is also within the scope of the present process to utilize a mixture of hydrocarbon and fatty acid ester types of drying oils in the production of the present composition. Thus, a desirable drying oil composition may be prepared by reacting a mixture of drying oils containing a major proportion of the hydrocarbon type of drying oil which is co-bodied in an initial stage of the reaction and thereafter admixed (with further co-bodying if desired) with a glyceride type of drying oil. The initial composition may also be prepared utilizing a major proportion of the fatty acid glyceride type of drying oil and subsequently introducing therein a minor proportion of the hydrocarbon type of drying oil. Alternatively, the two types of drying oils may be admixed in any proportion prior to co-bodying the same with the unsaturated amine and the product formed thereby admixed with additional quantities of either type of drying oil.

The present process is ordinarily conducted in a batch type procedure by charging the reactants in the desired proportion into a kettle in which the reaction mixture may be cooled or heated, as desired, and wherein the contents of the kettle may be stirred or otherwise agitated to obtain intimate admixture of the reactants. The kettle may also be fitted with a cooled vapor outlet or reflux condenser wherein excess amine may be condensed and removed from the system or returned for further co-bodying in the kettle. Following the initial co-bodying reaction, additional amine and/or drying oil may be introduced into the reaction mixture to modify the properties of the product. If a paint or varnish composition is desired, the product resulting from the co-bodying procedure may be admixed with other resins or with pigments and other coating composition ingredients to form a product which spreads smoothly when applied either as a spray or with a brush. In case a resin-like product is desired, the co-bodying procedure may be continued for more extended periods of reaction than specified above.

The invention is further illustrated by reference to the following example which indicates the method of co-bodying specific reactants employing specific co-bodying conditions; the example, however, is not to be interpreted as limiting the generally broad scope of the invention in strict accordance with the variables or processing methods specified therein.

2234.3 grams of raw linseed oil was mixed with 41.0 grams of octadienylbutenylisopropylamine and the mixture co-bodied by heating at a temperature of from about 280° to 300° C. for 6 hours. The loss in weight on heating was only 2.7 grams. The co-bodied mixture was vacuum distilled to remove any unreacted amine, but only 9 ml. was taken overhead at a vapor temperature of 305° C. (atmospheric pressure). 3 ml. of the overhead from the vacuum distillation was acid soluble, thus indicating that substantially all of the added amine had reacted with the linseed oil during the co-bodying operation. The product had a viscosity of 40 poises at 25° C. and a gardner color of 12. It was miscible in all proportions with drying oils of either the hydrocarbon type or of the unsaturated fatty acid ester type and the resulting mixtures when spread in thin films on an adhering surface produced transparent coating. Paint prepared by compositing the co-bodied drying oil-unsaturated amine composition with a drying oil and a pigment produced an adherent film which when subjected to a weathering test was non-corrosive and maintained its original appearance under severe weathering conditions.

I claim as my invention:

1. A process for the production of a composition of matter having drying properties which comprises co-bodying an unsaturated amine containing at least one alkenyl radical with a drying oil selected from the group consisting of the unsaturated fatty acid ester drying oils, the unsaturated hydrocarbon drying oils, and mixtures of said ester and hydrocarbon types of drying oils at a temperature of from about 150° C. to about 300° C. and for a time sufficient to effect at least partial copolymerization of said amine with said drying oil.

2. The process of claim 1 further characterized in that said unsaturated amine is reacted with said drying oil in an amount of said amine from a trace to about 50 per cent weight of said drying oil.

3. A process for the production of a composition of matter having drying properties which comprises co-bodying an unsaturated amine containing at least one alkenyl radical with an unsaturated fatty acid ester type of drying oil at a temperature of from about 150° C. to about 300° C. and for a time sufficient to effect at least partial copolymerization of said amine with said drying oil.

4. A process for the production of a composition of matter having drying properties which comprises co-bodying an unsaturated amine containing at least one alkenyl radical with an unsaturated hydrocarbon type of drying oil at a temperature of from about 150° C. to about 300° C. and for a time sufficient to effect at least partial copolymerization of said amine with said drying oil.

5. The process of claim 4 further characterized in that said unsaturated hydrocarbon type of drying oil is a cyclic hydrocarbon containing conjugated as well as nonconjugated unsaturation, said drying oil being recovered from a conjunct polymerization catalyst sludge as the hydrocarbon portion thereof.

6. The process of claim 1 further characterized in that said amine contains more than one alkenyl radical.

7. The process of claim 1 further characterized in that said amine contains more than one olefinic double bond.

8. A drying oil co-bodied with an unsaturated amine containing at least one alkenyl radical, said drying oil and amine being at least partially copolymerized and said drying oil being selected from the group consisting of the unsaturated fatty acid ester drying oils, the unsaturated hydrocarbon drying oils and mixtures of said ester and hydrocarbon drying oils.

JOSEPH D. DANFORTH.

REFERENCES CITED

The following references are of record in the file of this patent:

UNITED STATES PATENTS

| Number | Name | Date |
|---|---|---|
| 1,037,158 | Lilienfeld | Aug. 27, 1912 |
| 2,201,041 | Katz | May 14, 1940 |